United States Patent
Kodama et al.

(10) Patent No.: US 10,868,383 B2
(45) Date of Patent: Dec. 15, 2020

(54) SURFACE-TREATED PLATED MATERIAL, CONNECTOR TERMINAL, CONNECTOR, FFC TERMINAL, FFC, FPC AND ELECTRONIC PART

(71) Applicant: JX Nippon Mining & Metals Corporation, Tokyo (JP)

(72) Inventors: Atsushi Kodama, Ibaraki (JP); Satoru Endo, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 15/764,474

(22) PCT Filed: Jan. 30, 2017

(86) PCT No.: PCT/JP2017/003243
§ 371 (c)(1),
(2) Date: Mar. 29, 2018

(87) PCT Pub. No.: WO2018/138928
PCT Pub. Date: Aug. 2, 2018

(65) Prior Publication Data
US 2020/0243995 A1 Jul. 30, 2020

(51) Int. Cl.
*H01R 13/03* (2006.01)
*H01R 12/58* (2011.01)

(52) U.S. Cl.
CPC .......... *H01R 13/03* (2013.01); *H01R 12/585* (2013.01)

(58) Field of Classification Search
CPC .... C23C 28/023; H01R 13/03; H01R 12/585; Y10T 29/49224
See application file for complete search history.

(56) References Cited

U.S. PATENT DOCUMENTS 9,831,567 B2 * 11/2017 Miyakawa ............ C23C 28/023
9,834,848 B2 * 12/2017 Nishida ................ B32B 15/015
(Continued)

FOREIGN PATENT DOCUMENTS

| JP | 4-314896 | 11/1992 |
| JP | 4-314897 | 11/1992 |

(Continued)

OTHER PUBLICATIONS

Search Report in International Application No. PCT/JP2017/003243 dated Mar. 7, 2017, 2 pages.
(Continued)

*Primary Examiner* — Xuong M Chung Trans
(74) *Attorney, Agent, or Firm* — Marshall, Gerstein & Borun LLP

(57) ABSTRACT

A surface-treated plated material is provided. The surface-treated plated material can suppress generation of whiskers, maintain good solderability and low contact resistance even when exposed to an elevated temperature environment, and have lower insertion force for terminals/connectors. The surface-treated plated material comprises a substrate provided with an upper layer, and the upper layer comprises a plated material containing Sn or In. A surface of the plated material contains at least one compound represented by a certain general formula and at least one compound represented by a certain general formula. One or more compounds selected from a group D of constituent compounds represented by certain general formulae are further applied onto a surface on the upper layer side.

31 Claims, 1 Drawing Sheet

(56) References Cited

U.S. PATENT DOCUMENTS

| | | | |
|---|---|---|---|
| 10,069,231 B2 * | 9/2018 | Kato | C23C 30/00 |
| 10,079,439 B2 * | 9/2018 | Hase | H01R 4/185 |
| 10,601,158 B2 * | 3/2020 | Kajiwara | H05K 1/11 |
| 2015/0213918 A1 * | 7/2015 | Shibuya | B32B 15/01 |
| | | | 439/493 |
| 2015/0259813 A1 * | 9/2015 | Kodama | C25D 7/00 |
| | | | 428/648 |
| 2015/0295333 A1 * | 10/2015 | Shibuya | C25D 5/10 |
| | | | 439/887 |
| 2016/0264533 A1 | 9/2016 | Nomura et al. | |

FOREIGN PATENT DOCUMENTS

| | | |
|---|---|---|
| JP | 2004360004 A | 12/2004 |
| JP | 2005240093 A | 9/2005 |
| JP | 2007197791 A | 8/2007 |
| JP | 2015045045 A | 3/2015 |
| WO | WO-2015/056554 A1 | 4/2015 |

OTHER PUBLICATIONS

International Preliminary Report on Patentability and Written Opinion in International Application No. PCT/JP2017/003243 dated Aug. 8, 2019, 9 pages.

* cited by examiner

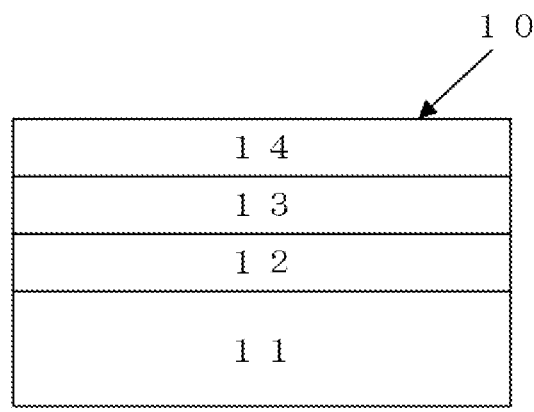

SURFACE-TREATED PLATED MATERIAL, CONNECTOR TERMINAL, CONNECTOR, FFC TERMINAL, FFC, FPC AND ELECTRONIC PART

TECHNICAL FIELD

The present invention relates to a surface-treated plated material, a connector terminal, a connector, an FFC terminal, an FFC, an FPC, and an electronic part.

BACKGROUND ART

In general, copper or a copper alloy is used as a base material for electronic parts such as connectors and terminals employed in various electronic devices such as motor vehicles, household appliances, office automation equipment, and the like, which are subjected to a plating treatment for the purpose of function improvement such as rust prevention, improvement of corrosion resistance and improvement of electrical characteristics. The plating includes various types such as Au, Ag, Cu, Sn, Ni, solder and Pd. In particular, a Sn plated material in which Sn or Sn alloy plating has been applied is frequently used for connectors, terminals, switches, outer lead portions of lead frames, and the like, in terms of costs, contact reliability, solderability and the like.

On the other hand, a so-called Sn based plated material such as Sn or Sn alloy has a problem of generating whiskers. The whiskers are those in which needle-like crystals of Sn are grown and are generated on metals having a relatively low melting point, such as Sn and Zn. The whiskers are grown in the form of beard to a length of several ten μm to several hundred μm and may cause electrical short circuit. Therefore, it is desired to prevent the generation and growth of the whiskers.

Furthermore, the Sn based plating has problems that the contact resistance is increased under an elevated temperature environment and the solderability is also deteriorated. To avoid these problems, a method of increasing the thickness of the Sn based plating may be employed. However, the method newly causes a problem that insertion force for terminals and connectors is increased, as will be described below.

Recently, there has been a problem that the number of pins of connectors has increased, thereby increasing the insertion force for the connectors. Since the work of assembling the connectors in motor vehicles or the like is often dependent on man power and the increase in the insertion force leads to increased burden on the operator's hands, it is desired to decrease the insertion force for the connectors. However, Sn causes larger friction during connection by means of fitting, and the increased number of wires of the connector will require strong insertion/extraction force.

For example, Patent Document 1 describes an invention in which a Sn plated layer is applied onto a surface of a steel plate and a chemical conversion coating containing P and Si is formed on the Sn plated layer in a specified amount of the chemical conversion coating applied. The patent document mentions that this invention would produce improved solderability and whisker resistance. However, since Si is present on the plated surface, there would be a problem that the contact resistance of the plating would be higher under an elevated temperature environment.

Further, Patent Document 2 describes an invention in which a surface of Sn or Sn alloy plating is treated with a solution containing a compound having amino nitrogen comprising at least two methylene groups to which phosphonic acid groups are bonded, or the like. The patent document mentions a method for post-treating the Sn or Sn alloy plating with a solution based on a phosphoric acid, but it does not describe any present state and applied amount of each element on the plated surface after the treatment. Therefore, it is expected that solderability and whisker resistance would not be improved at all depending on the composition of the treatment solution and the treatment conditions.

CITATION LIST

Patent Literatures

Patent Document 1: Japanese Patent Application Laid-open Publication No. 2004-360004 A1
Patent Document 2: Japanese Patent Application Laid-open Publication No. 2007-197791 A1

SUMMARY OF INVENTION

Technical Problem

In order to improve the whisker resistance and further reduce the insertion/extraction force in the conventional plated material in which Sn plating is applied to the Ni base or Cu base plating or in the three-layer plating, the thickness of the Sn plating may be made thinner. However, the thinner thickness of the Sn plating further causes a problem that Sn on the surface layer forms an alloy with Cu as a raw material or Ni and Cu as base plating under an elevated temperature environment so that Sn does not remain on the surface layer, and deterioration of solderability and contact resistance occurs, which deterioration is remarkable particularly in an elevated temperature atmosphere.

Therefore, an object of the present invention is to provide a surface-treated plated material which can suppress generation of whiskers, maintain good solderability and low contact resistance even when exposed to an elevated temperature environment, and have lower insertion force for terminals/connectors.

Solution to Problem

As a result of extensive studies to solve the above problems, the present inventors have surprisingly found that the surface-treated plated material which can suppress generation of whiskers and maintain good solderability and low contact resistance even when exposed to an elevated temperature environment can be obtained by applying plating containing Sn or In (hereinafter, referred to as Sn—In based plating) onto Ni base plating and further carrying out a surface treatment on the plating using a specific solution. Moreover, since the surface-treated plated material can make the surface layer Sn—In based plating thinner, the insertion force when used as a terminal/connector is lower. It cannot be predicted from the conventional findings that such a phenomenon occurs.

The present invention has been completed on the basis of the above findings. In one aspect, the present invention provides a surface-treated plated material, comprising a substrate provided with an upper layer, the upper layer comprising a plated material containing Sn or In, wherein a surface of the plated material contains at least one compound represented by the following general formula [1] or [2] and at least one compound represented by the following general formula [3], and wherein one or more compounds selected from a group D of constituent compounds represented by the following general formulae [4] to [8] are further applied onto a surface on the upper layer side:

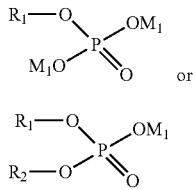
[1]
or
[2]

in which formula [1] or [2], $R_1$ and $R_2$ each independently represents an alkyl or a substituted alkyl, and $M_1$ represents hydrogen or an alkali metal;

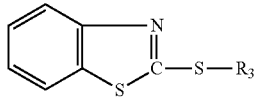
[3]

in which formula [3], $R_3$ represents an alkali metal or hydrogen;

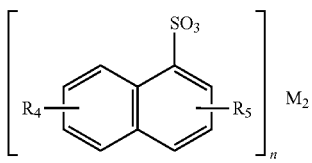
[4]

in which formula [4], $R_4$ and $R_5$ each independently represents an alkyl or a substituted alkyl, $M_2$ represents an alkali metal or an alkaline earth metal, and n represents an integer;

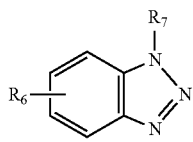
[5]

in which formula [5], $R_6$ represents hydrogen, an alkyl, or a substituted alkyl, and $R_7$ represents an alkali metal, hydrogen, an alkyl, or a substituted alkyl;

$C_nH_m$
[6]

in which formula [6], n and m each represents an integer;

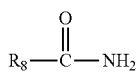
[7]

in which formula [7], $R_8$ represents an alkyl or a substituted alkyl;

$R_9$—O—$R_{10}$—OH
[8]

in which formula [8], $R_9$ and $R_{10}$ each independently represents an alkyl or a substituted alkyl.

In one embodiment of the surface-treated plated material according to the present invention, the total applied amount of the D constituent compound(s) present on the surface of the plated material is from 0.005 to 10.0 μg/mm².

In another embodiment of the surface-treated plated material according to the present invention, the plated material comprises a lower layer comprising one or more selected from a group A of constituent elements consisting of Ni, Cr, Mn, Fe, Co and Cu, the lower layer being formed on the substrate; an intermediate layer comprising one or more selected from the group A of constituent elements and one or two selected from a group B of constituent elements consisting of Sn and In, the intermediate layer being formed on the lower layer; and an upper layer comprising an alloy of one or two selected from the B group of constituent elements and one or more selected from a group C of constituent elements consisting of Ag, Au, Pt, Pd, Ru, Rh, Os and Ir, the upper layer being formed on the intermediate layer.

In yet another embodiment of the surface-treated plated material according to the present invention, the thickness of the lower layer is 0.05 μm or more and less than 5.00 μm, the thickness of the intermediate layer is 0.01 μm or more and less than 0.40 μm, and the thickness of the upper layer is 0.02 μm or more and less than 1.00 μm.

In yet another embodiment of the surface-treated plated material according to the present invention, the upper layer contains from 10 to 50 at. % of the one or two metals of the group B of constituent elements.

In yet another embodiment of the surface-treated plated material according to the present invention, the upper layer comprises a ζ (zeta) phase of a SnAg alloy containing from 11.8 to 22.9 at. % of Sn.

In yet another embodiment of the surface-treated plated material according to the present invention, the upper layer comprises an ε (epsilon) phase of $Ag_3Sn$.

In yet another embodiment of the surface-treated plated material according to the present invention, the upper layer comprises a ζ (zeta) phase of a SnAg alloy containing from 11.8 to 22.9 at. % of Sn and an ε (epsilon) phase of $Ag_3Sn$.

In yet another embodiment of the surface-treated plated material according to the present invention, the upper layer only comprises an E (epsilon) phase of $Ag_3Sn$.

In yet another embodiment of the surface-treated plated material according to the present invention, the upper layer comprises an ε (epsilon) phase of $Ag_3Sn$ and βSn of a Sn single phase.

In yet another embodiment of the surface-treated plated material according to the present invention, the upper layer comprising a ζ (zeta) phase of a SnAg alloy containing from 11.8 to 22.9 at % of Sn, an ε (epsilon) phase of $Ag_3Sn$, and βSn of a single Sn phase.

In yet another embodiment of the surface-treated plated material according to the present invention, the intermediate layer contains 35 at. % or more of the one or two metals of the group B of constituent elements.

In yet another embodiment of the surface-treated plated material according to the present invention, the intermediate layer comprises $Ni_3Sn_4$.

In yet another embodiment of the surface-treated plated material according to the present invention, the intermediate layer comprises $Ni_3Sn_4$ and $\beta Sn$ of a single Sn phase.

In yet another embodiment, the surface-treated plated material according to the present invention comprises a ratio of the thicknesses of the upper layer to the intermediate layer of from 9:1 to 3:7 in the upper layer: the inter mediate layer.

In still another embodiment, the surface-treated plated material according the present invention comprises an indentation hardness on the surface of the upper layer of 1000 MPa or more and 10000 MPa or less, the hardness being obtained by measuring a dent struck with a load of 3 mN on the surface of the upper layer by an ultra-micro hardness tester.

In yet another embodiment, the surface-treated plated material according to the present invention comprises an arithmetic mean height (Ra) of the surface of the upper layer of 0.3 µm or less.

In yet another embodiment, the surface-treated plated material according to the present invention comprises a maximum height (Rz) of the surface of the upper layer of 3 µm or less.

In yet another embodiment of the surface-treated plated material according to the present invention comprises the one or more metals of the group A of constituent elements in the total 50% by mass or more of Ni, Cr, Mn, Fe, Co and Cu, and further comprises one or more selected from the group consisting of B, P, Sn and Zn.

In yet another embodiment of the surface-treated plated material according to the present invention comprises the one or two metals of the group B of constituent elements in the total 50% by mass or more of Sn and In, the remaining alloy component being one or more metals selected from the group consisting of Ag, Au, Bi, Cd, Co, Cr, Cu, Fe, Mn, Mo, Ni, Pb, Sb, W and Zn.

In yet another embodiment of the surface-treated plated material according to the present invention comprises the one or more metals of the group C of constituent elements in the total 50% by mass or more of Ag, Au, Pt, Pd, Ru, Rh, Os and Ir, the remaining alloy component being one or more metals selected from the group consisting of Bi, Cd, Co, Cu, Fe, In, Mn, Mo, Ni, Pb, Sb, Se, Sn, W, Tl and Zn.

In yet another embodiment of the surface-treated plated material according to the present invention, the intermediate layer is composed of $Ni_3Sn$ and $Ni_3Sn_2$.

In yet another embodiment of the surface-treated plated material according to the present invention, the intermediate layer is comprised of $Ni_3Sn_2$.

In yet another embodiment of the surface-treated plated material according to the present invention, the intermediate layer is comprises of $Ni_3Sn_4$.

In yet another embodiment, the surface-treated plated material according to the present invention further comprises a layer comprising an alloy of the one or more metals of the group A of constituent elements and the one or more metals of the group C of constituent elements, between the lower layer and the intermediate layer.

In another aspect, the present invention provides a connector terminal comprising the surface-treated plated material according to the present invention at a contact portion.

In yet another aspect, the present invention provides a connector comprising the connector terminal according to the present invention.

In yet another aspect, the present invention provides an FFC terminal comprising the surface-treated plated material according to the present invention at a contact portion.

In yet another aspect, the present invention provides an FFC comprising the FFC terminal according to the present invention.

In yet another aspect, the present invention provides an FPC comprising the FFC terminal according to the present invention.

In yet another aspect, the present invention provides an electronic part comprising the surface-treated plated material according to the present invention on at least one external connecting electrode.

In yet another aspect, the present invention provides an electronic part comprising a press-fit type terminal, the press-fit type terminal comprising a female terminal connecting portion on one side of a mounting portion to be attached to a housing and a substrate connecting portion on the other side, the press-fit type terminal being attached to the substrate by press-fitting the substrate connecting portion into a through hole formed in the substrate, wherein the press-fit type terminal comprises the surface-treated plated material according to the present invention.

Advantageous Effects of Invention

According to the present invention, it is possible to provide a surface-treated plated material which can suppresses generation of whiskers, maintain good solderability and low contact resistance even when exposed to an elevated temperature environment, and have low insertion force for terminals/connectors.

BRIEF DESCRIPTION OF DRAWINGS

FIG. 1 is a schematic view showing a configuration of a surface-treated plated material according to an embodiment of the present invention.

DESCRIPTION OF THE PREFERRED EMBODIMENTS

Hereinafter, a surface-treated plated material according to an embodiment of the present invention will be described. As shown in FIG. 1, a surface-treated plated material 10 according to an embodiment of the present invention includes a layer 12 as a lower layer formed on a substrate 11; a layer 13 as an intermediate layer formed on the layer 12; and a layer 14 as an upper layer formed on the layer 13. Further, the surface-treated plated material 10 according to an embodiment of the present invention may include a layer 12 as a base plating or a lower layer formed on the substrate 11; a layer 13 as an alloy layer of the layer 12 and a Sn—In based plating or as an intermediate layer formed on the layer 12; and a layer 14 as a plated layer containing Sn or In or as an upper layer formed on the layer 13.

<Structure of Surface-Treated Plated Material>

The surface-treated plated material according to the embodiment of the present invention includes the layer 14 as an upper layer provided on the substrate 11, wherein the upper layer includes the plated material containing Sn or In. The surface of the plated material contains at least one compound represented by the following general formula [1] or [2] as described below and at least one compound represented by the general formula [3] as described below, and one or more selected from a group D of constituent compounds represented by the general formulae [4] to [8] as described below are applied onto the surface on the upper layer side.

(Substrate 11)

The substrate 11 that can be used includes, but not limited to, for example, substrates made of metals such as copper and copper alloys, Fe based materials, stainless steel, titanium and titanium alloys, aluminum and aluminum alloys, and the like. In addition, the substrate 11 may be a composite material of a resin layer and a metal substrate. Examples of the composite of the resin layer and the metal substrate include electrode portions on FPC substrates (Flexible Printed Circuit substrates, Flexible Printed Circuits) or FFC (Flexible Flat Cables) substrates.

(Layer 14)

The layer 14 as shown in FIG. 1 may be preferably formed from plating containing Sn or In, or one or two elements selected from a group B of constituent elements consisting of Sn and In, and one or more of a group C of constituent elements selected from Ag, Au, Pt, Pd, Ru, Rh, Os and Ir.

Although Sn and In are oxidizing metals, they are characterized in that they are relatively soft among metals. Therefore, even if an oxide film is formed on the surfaces of Sn and In, for example, the oxide film is easily scraped off and contact points become contacted with each other as metals when a male terminal and a female terminal are fitted to each other using the surface-treated plated material as a material for the contact points, so that lower contact resistance can be obtained.

Further, Sn and In have good gas corrosion resistance to gases such as a chlorine gas, sulfurous acid gas, hydrogen sulfide gas and the like, and they serve to improve the gas corrosion resistance, for example when using Ag having poor gas corrosion resistance for the layer 14, using Ni having poor gas corrosion resistance for the layer 12, or using copper and copper alloys having poor gas corrosion resistance for the substrate 11. It should be note that among Sn and In, Sn are preferable, because In is severely regulated based on the Technical Guideline for Prevention Health Impairment by the Ministry of Health, Labor and Welfare of Japan.

Ag, Au, Pt, Pd, Ru, Rh, Os and Ir are characterized in that they are relatively heat resistant, among metals. Therefore, each composition of the substrate 11, the layer 12 and the layer 13 is prevented from diffusing toward the layer 14 side, thereby improving the heat resistance. Further, these metals form compounds with Sn and In in the layer 14 to suppress the formation of oxide films of Sn and In, thereby improving the solder wettability. Among Ag, Au, Pt, Pd, Ru, Rh, Os and Ir, Ag may be more preferable, in terms of conductivity. Ag has high conductivity. For example, if Ag is used for high-frequency signal applications, impedance resistance will be decreased due to a skin effect.

The thickness of the layer 14 may preferably be 0.02 μm or more and less than 1.00 μm. If the thickness of the layer 14 is less than 0.02 μm, the compositions of the substrate 11 and the layer 12 will tend to diffuse toward the layer 14 side, so that the heat resistance and the solder wettability will be deteriorated. Further, the layer 14 will be worn out due to fretting and the layer 12 having high contact resistance will tend to be exposed, so that fretting corrosion resistance will be deteriorated, and the contact resistance will tend to increase due to the fretting. Furthermore, because the layer 12 having poor gas corrosion resistance tends to be exposed, the gas corrosion resistance will also be deteriorated, and the appearance will be discolored when a gas corrosion test is carried out. On the other hand, if the thickness of the layer 14 is 1.00 μm or more, a thin film lubricating effect by the hard substrate 11 or the layer 12 will be decreased, so that adhesive wear will tend to be increased. Further, mechanical durability will be decreased, so that scrapping of plating will tend to occur.

The layer 14 may be pure Sn or pure In, or an alloy plating containing these elements, and may preferably contain from 10 to 50 at. % of the metal(s) of the B group of constituent elements. If the content of the metal(s) of the B group of constituent elements is less than 10 at. %, the gas corrosion resistance will be poor and appearance may be discolored by carrying out a gas corrosion test, for example when the metal of the C group of constituent elements is Ag. On the other hand, if the content of the metal(s) of the B group of constituent elements is more than 50 at. %, the proportion of the metal(s) of the B group of constituent elements in the layer 14 will be increased, so that adhesive wear will be increased, and whiskers will be liable to be generated. Further, it may result in poor fretting corrosion resistance.

In the layer 14 there may preferably be a ζ (zeta) phase that is a SnAg alloy containing from 11.8 to 22.9 at. % of Sn. The presence of the ζ (zeta) phase will improve the gas corrosion resistance, so that it will be difficult to discolor the appearance even after conducting the gas corrosion test.

In the layer 14 there may preferably be a ζ (zeta) phase and an ε (epsilon) phase that is $Ag_3Sn$. The presence of the ε (epsilon) phase will lead to harder coating and decreased adhesive wear, as compared with the case where there is only the ζ(zeta) phase in the layer 14. Further, the increased proportion of Sn in the layer 14 will lead to improved gas corrosion resistance.

In the layer 14 there may preferably be only the ε (epsilon) phase that is $Ag_3Sn$. The presence of the ε (epsilon) phase alone in the upper layer 14 will lead to harder coating and decreased adhesive wear, as compared with the case where there is the ζ (zeta) phase and the ε (epsilon) phase that is $Ag_3Sn$ in the layer 14. Further, the increased proportion of Sn in the layer 14 will lead to improved gas corrosion resistance.

In layer 14 there may preferably be the ε (epsilon) phase that is $Ag_3Sn$ and βSn that is a Sn single phase. The presence of the ε (epsilon) phase that is $Ag_3Sn$ and βSn that is a Sn single phase will lead to improved gas corrosion resistance because the proportion of Sn in the upper layer will be further increased as compared with the case where there is only the ε (epsilon) phase in the layer 14.

In the layer 14 there may preferably be the ζ (zeta) phase that is a SnAg alloy containing from 11.8 to 22.9 at. % of Sn, the ε (epsilon) phase that is $Ag_3Sn$, and βSn that is a Sn single phase. The presence of the ζ (zeta) phase, the ε (epsilon) phase that is $Ag_3Sn$ and βSn that is Sn single phase will lead to improved gas corrosion resistance, suppress discoloration of the appearance even if the gas corrosion test is performed and result in decreased adhesive wear. The composition is caused by diffusion and is not a structure in an equilibrium state.

The βSn should not be present alone in the layer 14. If the βSn is present alone, the adhesive wear will become large, the whiskers will be generated, and properties such as the heat resistance and the fretting corrosion resistance will be deteriorated.

(Layer 13)

It is preferable that the layer 13 as shown in FIG. 1 is formed between the layer 12 and the layer 14. The layer 13 may be composed of an alloy layer of the Sn—In based plating and the layer 12 or one or more selected from the A group of constituent elements consisting of Ni, Cr, Mn, Fe, Co and Cu, and one or two selected from the B group of constituent elements consisting of Sn and In. The layer 13 may be preferably formed with a thickness of 0.01 μm or more and less than 0.40 μm.

Sn and In have good gas corrosion resistance to gases such as a chlorine gas, sulfurous acid gas, hydrogen sulfide gas and the like, and have an effect of improving the gas corrosion resistance of the surface-treated plated material, for example when using Ni which has poor gas corrosion resistance for the lower layer 12, and copper and a copper alloy which have poor gas corrosion resistance for the substrate 11. Ni, Cr, Mn, Fe, Co, and Cu lead to harder coating as compared with Sn and In, so that they are less liable to generate the adhesive wear, prevent the constituent metal(s) in the substrate 11 from diffusing into the upper layer 14, and improve durability such as by suppressing deterioration of the heat resistance and solder wettability.

If the thickness of the layer 13 is 0.01 μm or more, the coating will become harder and the adhesive wear will be decreased. On the other hand, if the thickness of the intermediate layer 13 is 0.40 μm or more, the bending workability will be deteriorated and the mechanical durability will also be decreased, so that scrapping of plating may be generated. Among Sn and In, Sn are preferable, because In is severely regulated based on the Technical Guideline for Prevention Health Impairment by the Ministry of Health, Labor and Welfare of Japan. Further, among Ni, Cr, Mn, Fe, Co and Cu, Ni is preferable, because Ni is harder and is less liable to generate the adhesive wear, and also provides sufficient bending workability.

The layer 13 may preferably contain 35 at. % or more of the metal(s) of the B group of constituent elements. If an amount of Sn is 35 at. % or more, the coating will become harder and the adhesive wear may be decreased. The layer 13 may be composed of $Ni_3Sn$ and $Ni_3Sn_2$, or may be composed of $Ni_3Sn_2$ or $Ni_3Sn_4$ alone. The presence of $Ni_3Sn$, $Ni_3Sn_2$ or $Ni_3Sn_4$ may lead to improvement of the heat resistance and the solder wettability. It is preferable that $Ni_3Sn_4$ and βSn which is a single Sn phase are present in the layer 13. The presence of these materials may lead to improvement of the heat resistance and the solder wettability as compared with the case where $Ni_3Sn_4$ and $Ni_3Sn_2$ are present.

(Relationship Between Thickness of Layer 14 and Minimum Thickness of Layer 14)

The minimum thickness (μm) of the layer 14 may preferably be 50% or more of the thickness (μm) of the layer 14. The minimum thickness of the layer 14 of less than 50% of the thickness of the layer 14 will lead to higher surface roughness of the layer 14, which may result in poor heat resistance, poor solder wettability and poor gas corrosion resistance because Ni having higher contact resistance, lower solder wettability and poor gas corrosion resistance will tend to be exposed on the surface.

Here, the position for grasping the relationship between the thickness of the layer 14 and the minimum thickness of the upper layer 14 is an average cross section of a portion exerting the function and effect of the coating according to the present invention. It indicates a portion that has normally undergone the deposition process in the normal surface profile (which does not include oil pit, etch pit, scratch, dent and other surface defects) of the material in such a portion. Needless to say, it does not include any deformed portion and the like by means of press working before and after the deposition process.

(Ratio of Thickness of Layer 14 and Layer 13 and Compositions)

The ratio of the thicknesses of the layer 14 and the layer 13 may be from 9:1 to 3:7 in the layer 14: the layer 13. If the ratio of the layer 14 is more than 9, the thin film lubricating effect will be decreased in the layer 13 harder than the hard substrate layer 11, the layer 12 and the layer 14, and will result in increased adhesive wear. On the other hand, if the ratio of the layer 14 is less than 3, Ni having higher contact resistance, lower solder wettability and poor gas corrosion resistance will tend to be exposed on the surface, so that the heat resistance, solder wettability, fretting corrosion resistance and gas corrosion resistance may be deteriorated.

Further, it is preferable that each of C, S, and O may be preferably contained in an amount of 2 at. % or less, from the layer 14 to the layer 13 excluding a range of 0.03 μm from the outermost surface of the layer 14. If each of C, S and O is more than 2 at. %, these eutectoid elements will gasify when carrying out the heat treatment, so that any uniform alloy coating may not be formed.

(Layer 12)

The layer 12 as shown in FIG. 1 may be preferably formed on the substrate 11. The layer 12 may be composed of any base plating or one or more selected from the group A of constituent elements consisting of Ni, Cr, Mn, Fe, Co and Cu. By forming the layer 12 using one or more metals selected from the A group of constituent elements consisting of Ni, Cr, Mn, Fe, Co and Cu, the thin film lubricating effect will be improved due to the formation of the harder lower layer 12 and the adhesive wear will be decreased, so that the lower layer 12 will prevent the constituent metal(s) of the substrate 11 from diffusing into the layer 14, thereby improving the heat resistance and the solder wettability.

The thickness of the layer 12 may preferably be 0.05 μm or more. If the thickness of the layer 12 is less than 0.05 μm, the thin film lubricating effect by the harder layer 12 will be decreased and the adhesive wear will tend to be increased. Further, the constituent metal(s) of the substrate 11 will tend to easily diffuse into the layer 14, so that the heat resistance and the solder wettability will tend to be deteriorated. On the other hand, the thickness of the lower layer 12 may preferably be less than 5.00 μm. If the thickness is 5.00 μm or more, the bending workability will tend to be deteriorated.

Between the lower layer 12 and the intermediate layer 13 may be a layer composed of an alloy of the metal(s) of the A group of constituent elements and the metal(s) of the C group of constituent elements. Such a layer may preferably be, for example, a Ni—Ag alloy layer. The formation of such a layer between the layer 12 and the layer 13 will allow better prevention of diffusion of the constituent metal(s) of the substrate 11 into the layer 14, thereby improving the heat resistance and the solder wettability.

(Group a of Constituent Elements)

The metals of the group A of constituent elements may be contained in the total 50% by mass or more of Ni, Cr, Mn, Fe, Co and Cu, and one or more selected from the group consisting of B, P, Sn and Zn may be contained. Such an alloy composition of the layer 12 will lead to further hardening of the layer 12, so that the thin film lubricating effect may be further improved to further reduce the adhesive wear, and alloying of the layer 12 may further prevent the constituent metal(s) of the substrate 11 from diffusing into the upper layer and improve durability such as the heat resistance and the solder wettability.

(Group B of Constituent Elements)

The metals of the group B of constituent elements may be contained in the total 50% by mass or more of Sn and In, and the remaining alloy component may be comprised of one or more selected from the group consisting of Ag, As, Au, Bi, Cd, Co, Cr, Cu, Fe, Mn, Mo, Ni, Pb, Sb, W and Zn. These metals may further reduce the adhesive wear, suppress generation of the whiskers, and further improve durability such as the heat resistance and the solder wettability.

(Group C of Constituent Elements)

The metals of the group C of constituent elements may be contained in the total 50% by mass or more of Ag, Au, Pt, Pd, Ru, Rh, Os and Ir, and the remaining alloy component may be comprised of one or more metals selected from Bi, Cd, Co, Cu, Fe, In, Mn, Mo, Ni, Pb, Sb, Se, Sn, W, Tl and Zn. These metals may further reduce the adhesive wear, suppress generation of the whiskers, and further improve durability such as the heat resistance and the solder wettability.

(Diffusion Treatment)

The layer 14, the layer 13, and the layer 12 may be respectively formed by depositing one or more selected from the group A of constituent elements on the substrate 11, then depositing one or more selected from the group C of constituent elements and then depositing one or two selected from the group B of constituent elements, whereby the respective elements of the group A of constituent elements, the group B of constituent elements and the group C of constituent elements diffuse. For example, when the metal of the group B of constituent elements is Sn and the metal of the group C of constituent elements is Ag, the diffusion of Ag into Sn is faster and a Sn—Ag alloy layer is formed by spontaneous diffusion. The formation of the alloy layer can further reduce adhesion force of Sn, and further improve a lower whisker property and durability.

(Heat Treatment)

A heat treatment may be performed for the purpose of further suppressing the adhesive wear after forming the layer 14 and further improving the low whisker property and durability. The heat treatment will allow easier forming of alloy layers of the metal(s) of the group B constituent elements and the metal(s) of the group C of constituent elements in the layer 14 as well as the metal(s) of the group A of constituent elements and the metal(s) of the group B of constituent elements in the layer 13, and further reduction of the adhesion force of Sn, and further improvement of the low whisker property and durability.

It should be noted that for the heat treatment, treatment conditions (temperature× time) may be selected as appropriate. Further, the heat treatment may not be particularly required. If the heat treatment is carried out, the performing of the heat treatment at a temperature equal to or higher than the melting point of the metal(s) of the group B of constituent elements will allow easier forming of alloy layers of the metal(s) of the group B of constituent elements and the metal(s) of the group C of constituent elements in the layer 14 as well as the metal(s) of the group A of constituent elements and the metal(s) of the group B of constituent elements in the layer 13. For this heat treatment, treatment conditions (temperature×time) may be selected as appropriate.

(Post-Treatment)

A post-treatment may be carried out on the layer 14 or after performing the heat treatment on the layer 14, for the purpose of further reducing the adhesive wear and also improving the corrosion resistance and the heat resistance. The post-treatment will improve lubricity, and further improve the corrosion resistance, and also suppress oxidation of the layer 14, so that the durability such as the heat resistance and the solder wettability can be improved. Specific examples of the post-treatment include a rust prevention treatment using an inhibitor and at least one phosphate compound, a lubrication treatment using at least one organic compound, and the like.

The post-treatment may be carried out by treating the surface of the layer 14 with a solution (hereinafter, referred to as a post-treatment solution) containing one or more phosphate esters, at least one mercaptobenzothiazole compound, and further a group D of constituent compounds (lubricants and rust inhibitors).

The phosphate ester which is one of the essential components for the post-treatment solution functions as an antioxidant and a lubricant for plating. The phosphate esters used in the present invention are represented by the general formulae [1] and [2]. Preferred examples of the compound represented by the general formula [1] include lauryl acidic phosphate monoesters and the like. Preferred examples of the compound represented by the general formula [2] include lauryl acidic phosphate diesters and the like.

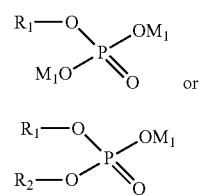

In the formulae [1] and [2], $R_1$ and $R_2$ each independently represents an alkyl or a substituted alkyl, and $M_1$ represents hydrogen or an alkali metal.

The mercaptobenzothiazole compound which is another essential component for the post-treatment solution functions as an antioxidant and an anticorrosion agent for plating. Preferred examples of the mercaptobenzothiazole compounds used in the present invention include mercaptobenzothiazole, a Na salt of mercaptobenzothiazole, a K salt of mercaptobenzothiazole, and the like, as shown by the general formula [3].

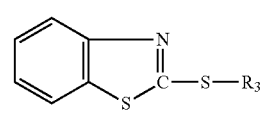

In the formula [3], $R_3$ represents an alkali metal or hydrogen.

The group D of constituent compounds added to the post-treatment solution serves as a lubricant and an anticorrosion agent. The group D of constituent compounds used in the present invention is represented by the general formulae [4] to [8]. In the present invention, one or more compounds are selected from the constituent compounds and added to the post-treatment solution.

Preferred examples of the compounds represented by the general formula [4] include barium dinonylnaphthalenesulfonate, calcium dinonylnaphthalenesulfonate, zinc dinonylnaphthalenesulfonate, sodium dinonylnaphthalenesulfonate, lithium dinonylnaphthalenesulfonate, and the like.

Preferred examples of the compounds represented by the general formula [5] include benzotriazole, a Na salt of benzotriazole, and the like.

Preferred examples of the compounds represented by the general formula [6] include paraffin wax, white petrolatum, and the like.

Preferred examples of the compounds represented by the general formula [7] include oleic amide, stearic amide, lauric amide and the like.

Preferred examples of the compounds represented by the general formula [8] include propylene glycol t-butyl ether, propylene glycol monomethyl ether and the like.

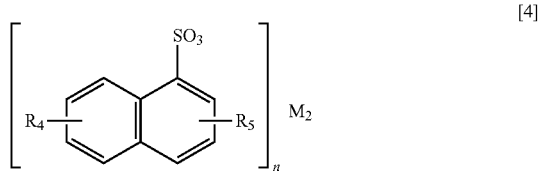

[4]

In the formula [4], $R_4$ and $R_5$ each independently represents an alkyl or a substituted alkyl, $M_2$ represents an alkali metal or an alkaline earth metal, and n represents an integer.

[5]

In the formula [5], $R_6$ represents hydrogen, an alkyl, a substituted alkyl, and $R_7$ represents an alkali metal, hydrogen, an alkyl or a substituted alkyl.

[6]

In the formula [6], n and m each represents an integer.

[7]

In the formula [7], $R_8$ represents an alkyl or a substituted alkyl.

[8]

In the formula [8], $R_9$ and $R_{10}$ each independently represents an alkyl or a substituted alkyl.

In the present invention, the total amount of the D constituent compounds on the surface of the layer 14 may preferably be from 0.005 to 10.0 μg/mm², because it will lead to good lubricity and better corrosion resistance. If the applied amount of the constituent compound is less than 0.005 μg/mm², the lubricity of the plated material will be insufficient, and if the applied amount is more than 10.0 μg/mm², deficiencies such as deteriorated appearance and higher contact resistance will occur.

In order to achieve the applied amount of the post-treatment components on the surface of the layer 14 according to the present invention, the plating is subjected to the diffusion or heat treatment, then subjected to a dipping treatment in the post-treatment solution, or an electrolytic treatment in the post-treatment solution, or application of the post-treatment solution. Further, combinations such as the application after the electrolytic treatment are also possible.

The post-treatment solution for the plated material that can be used in the present invention includes an emulsion of the respective components in water or a solution of the respective components in an organic solvent such as methanol.

The concentration of the phosphate ester required for obtaining the applied amount of the post-treatment solution components on the surface of the upper layer 14 according the present invention may be from 0.1 to 10 g/L, and preferably from 0.5 to 5 g/L, based on the total volume of the treatment solution. On the other hand, the concentration of the benzothiazole compound may be from 0.01 to 1.0 g/L, and preferably from 0.05 to 0.6 g/L, based on the total volume of the treatment solution. Further, the concentration of the D constituent compound(s) may be from 0.1 to 50 g/L, and preferably from 0.5 to 10 g/L, based on the total volume of the treatment solution.

Although there is no time restriction on the post-treatment, the post-treatment may be carried out in a series of steps, from an industrial point of view.

<Characteristics of Surface-Treated Plated Material>

The surface of the layer 14 may preferably have an indentation hardness of 1000 MPa or more, which hardness is obtained by measuring a dent stuck with a load of 3 mN on the surface of the layer 14, according to an ultra-fine hardness test. The indentation hardness of 1000 MPa or more improves the thin film lubricating effect produced by the harder upper layer 14 and reduces the adhesive wear. It is preferable that the indentation hardness of the surface of the upper layer is 10,000 MPa or less. If the indentation hardness of the surface of the upper layer 14 is 10,000 MPa or less, the bending workability will be improved, and cracks will be hardly formed on a molded portion when the surface-treated plated material according to the present invention is press-molded, so that a decrease in the gas corrosion resistance will be suppressed.

The surface of the layer 14 may preferably have an arithmetic average height (Ra) of 0.3 μm or less. If the arithmetic average height (Ra) of the surface of the layer 14 is 0.3 μm or less, the number of convex portions which are relatively liable to be corroded will be reduced and the surface will become smooth, so that the gas corrosion resistance will be improved.

The surface of the layer 14 may preferably have a maximum height (Rz) of 3 μm or less. If the maximum height (Rz) of the surface of the upper layer 14 is 3 μm or less, the number of convex portions which are relatively liable to be corroded will be reduced and the surface will become smooth, so that the gas corrosion resistance will be improved.

<Application of Surface-Treated Plated Material>

The surface-treated plated material according to the present invention may be employed for various applications, including, but not limited to, for example, connector terminals using the surface-treated plated material for their contact portions, FFC terminals or FPC terminals using the surface-treated plated material for their contact portions, electronic parts using the surface-treated plated material for their external connecting electrodes, and the like. The terminals include crimp terminals, soldering terminals, press-fit terminals and the like, despite methods of joining them to the wiring side. Examples of the external connecting electrodes include connecting parts obtained by subjecting tabs to a surface treatment and materials subjected to a surface treatment for under bump metallurgy of semiconductors.

Further, the connector terminals thus formed may be used to produce connectors, and the FFC terminals or the FPC terminals may be used to produce FFCs or FPCs.

Further, the surface-treated plated material according to the present invention may be used for a press-fit type terminal in which a female terminal connecting portion is provided on one side of a mounting portion to be attached to a housing and a substrate connecting portion is provided on the other side, and the substrate connecting portion is press-fitted into a through hole formed in the substrate, thereby allowing attachment to the substrate.

Both the male terminal and the female terminal of the connector may be the surface-treated plated material according to the present invention, or only one of the male terminal and the female terminal may be the surface-treated material according to the present invention. When both of the male terminal and the female terminal are the surface-treated plated material according to the present invention, a low insertion/extraction property will be further improved.

<Method for Producing Surface-Treated Plated Material>

A method for producing the surface-treated plated material according to the present invention that can be used includes wet (electric and electroless) plating, dry (sputtering, ion plating, and the like) plating, and the like.

EXAMPLES

Hereinafter, Examples of the present invention are shown together with Comparative Examples, but these examples are provided for better understanding of the present invention and are not intended to limit the present invention.

In each of Examples and Comparative examples, the surface treatment was carried out in the order of electrolytic degreasing, pickling, first plating, second plating, third plating and a heat treatment under the conditions as shown in Table 1.

(Materials)
(1) Plate Material: a thickness of 0.30 mm, a width of 30 mm, component Cu-30Zn;
(2) Male Terminal: a thickness of 0.64 mm, a width of 2.3 mm, component Cu-30Zn;
(3) Press-fit Type Terminal: a press-fit terminal PCB connector, R 800, available from Tokiwa & Co., Inc.

(First Plating Conditions)
(1) Semi-bright Ni Plating
Plating Method: electroplating;
Plating Solution: a Ni sulfamate plating solution+saccharin;
Plating Temperature: 55° C.;
Current Density: from 0.5 to 4 A/dm$^2$.
(2) Bright Ni Plating
Plating Method: electroplating;
Plating Solution: a Ni sulfamate plating solution+saccharin+additive;
Plating Temperature: 55° C.;
Current Density: from 0.5 to 4 A/dm$^2$.
(3) Cu Plating
Plating Method: electroplating;
Plating Solution: a Cu sulfate plating solution;
Plating Temperature: 30° C.;
Current Density: from 0.5 to 4 A/dm$^2$.
(4) Matt Ni Plating
Plating Method: electroplating;
Plating Solution: a Ni sulfamate plating solution;
Plating Temperature: 55° C.;
Current Density: from 0.5 to 4 A/dm$^2$.
(5) Ni—P Plating
Plating Method: electroplating;
Plating Solution: a Ni sulfamate plating solution+phosphite;
Plating Temperature: 55° C.;
Current Density: from 0.5 to 4 A/dm$^2$.

(Second Plating Conditions)
(1) Ag Plating
Plating Method: electroplating;
Plating Solution: an Ag cyanide plating solution;
Plating Temperature: 40° C.;
Current Density: from 0.2 to 4 A/dm$^2$.
(2) Sn Plating
Plating Method: electroplating;
Plating Solution: a Sn methane sulfonate plating solution;
Plating Temperature: 40° C.;
Current Density: from 0.5 to 4 A/dm$^2$.

(Third Plating Conditions)
(1) Sn Plating Conditions
Plating Method: electroplating;
Plating Solution: a Sn methane sulfonate plating solution;
Plating Temperature: 40° C.;
Current Density: from 0.5 to 4 A/dm$^2$.
(2) In Plating Conditions
Plating Method: electroplating;
Plating Solution: a In sulfate plating solution;
Plating Temperature: 30° C.;
Current Density: from 0.5 to 2 A/dm$^2$.

(Heat Treatment)

The heat treatment was carried out by placing a sample on a hot plate and confirming that the surface of the hot plate had reached a predetermined temperature.

(Post-Treatment)

Respective components (phosphate ester(s), a mercapto compound, a D constituent compound(s)) shown in Table 1 was dissolved in isoparaffin ($C_{10}$ to $C_{12}$) to prepare a surface treatment solution, which was applied by spraying onto the surface of the plated material after the heat treatment and further dried by warm air. Surface treatment conditions in this case are shown in Table 2 below. An amount of the D constituent compound(s) applied on to the surface of the plated material was determined by first dissolving the deposit on the surface of the plated material in methanol and then performing measurement using an LC-QMS analyzer (ACQUITY UPLC H-CLASS, ACQUITY QDa detector available from Waters Corporation).

(Determination of Structures [Compositions] of Upper and Intermediate Layer and Measurement of Thickness)

The structures and thicknesses of the upper and intermediate layers of the resulting samples were determined by line analysis with STEM (scanning electron microscope) analysis. Elements analyzed are of the compositions of the upper, intermediate and lower layers, and C, S and O. These elements are defined as designated elements. Further, the concentration (at. %) of each element was analyzed with the total of designated elements set as 100%. The thickness corresponds to a distance determined by the line analysis (or surface analysis). As the STEM device, JEM-2100F available from JEOL Ltd. was used. The acceleration voltage of the device is 200 kV.

The structures and thicknesses of the upper layer and the intermediate layer of the resulting samples were evaluated at arbitrary 10 points and the evaluated values were averaged.

(Measurement of Thickness of Lower Layer)

The thickness of the lower layer was measured with an X-ray fluorescent analysis thickness meter (SFT 9550 X, 0.1 mmΦ collimator, available from Seiko Instruments).

The thickness of the lower layer was evaluated at arbitrary 10 points and the evaluated values were averaged.

(Evaluation)

Each sample was evaluated as follows:

Adhesive Wear

The adhesive wear was evaluated by inserting and extracting a plated male terminal into and from a commercially available Sn reflow plated female terminal (model 090 Sumitomo TS/Yazaki 090 II series female terminal, non-waterproof/F 090-SMTS).

A measuring device used for the test was 1311 NR available from AIKOH ENGINEERING CO., LTD. and the evaluation was performed at a male pin sliding distance of 5 mm. The number of samples was 5, and the adhesive wear was evaluated by using insertion force. As the insertion force, a value obtained by averaging the maximum values of the respective samples was adopted. As a blank material for the adhesive wear, the sample of Comparative Example 5 was adopted.

The target of the adhesive wear was less than 70% relative to the maximum insertion/extraction force of Comparative Example 5.

Contact Resistance

The contact resistance was measured by a four-terminal method under a condition of a contact load of 50 g using a contact simulator model CRS-113-Au available from Yamazaki Seiki Co., Ltd. The number of samples was 5, and a range from the minimum value to the maximum value of each sample was adopted. The target characteristic was a contact resistance of 10 mΩ or less.

Heat Resistance

The heat resistance was evaluated by measuring the contact resistance of each sample after an air atmospheric heating (180° C.×1000 h) test. The target characteristic was a contact resistance of 10 mΩ or less, and the maximum target was such that the contact resistance was not changed (i.e., the contact resistance was equivalent) before and after the heat resistance test.

Fretting Corrosion Resistance

The fretting corrosion resistance was measured under conditions of a sliding distance of 0.5 mm, a sliding speed of 1 mm/s, a contact load of 1 N and a number of reciprocating sliding of 500 using a precision sliding test device model CRS-G2050 available from Yamazaki Seiki Co., Ltd., and the relationship between the number of sliding and the contact resistance was evaluated. The number of samples was 5, and a range from the minimum value to the maximum value of each sample was adopted. The target characteristic was a contact resistance of 100 mΩ or less at the time of the sliding number of 100.

Solder Wettability

The solder wettability was evaluated for plated samples. A solder wetting time of each sample was measured by a meniscograph method using a commercially available 25% rosin methanol flux as a flux with a solder checker (SAT-5200 available from RHESCA CO., LTD.). As the plating, Sn-3Ag-0.5Cu (250° C.). The number of samples was 5, and a range from the minimum value to the maximum value of each sample was adopted. The target characteristic was a zero-cross time of 5 seconds (s) or less.

Gas Corrosion Resistance

The gas corrosion resistance was evaluated in the following test environment. The gas corrosion resistance was evaluated for an appearance of each sample at the end of the environmental test. The target characteristic was such that the appearance was not changed or slightly discolored at a level without a practical problem.

Hydrogen Sulfide Gas Corrosion Test

Hydrogen Sulfide Concentration: 10 ppm;
Temperature: 40° C.;
Humidity: 80% RH;
Exposure Time: 96 h;
Number of Samples: 5.

Mechanical Durability

The mechanical durability was determined by extracting the press-fit type terminal inserted in a through hole (a substrate thickness of 2 mm, a through hole having Φ1 mm) from the through hole, observing the cross section of the press-fit type terminal by SEM (model JSM-5410 available from JEOL Corporation) at a magnification of from 100 to 10000, and confirming the state of powder generated. A sample having a particle diameter of less than 5 μm was evaluated as ○, a sample having a particle diameter of from 5 to less than 10 μm was evaluated as Δ, and a sample having a particle diameter of 10 μm or more was evaluated as x.

Bending Workability

The bending workability was evaluated by 90° bending under a condition that a ratio of a thickness of each sample to a bending radius was 1, using a W-shaped mold. The evaluation was performed by observing the surface of the bended portion with an optical microscope; a sample was evaluated as ○ when no crack was observed and an operator determined that there was no practical problem; a sample was evaluated as x when a crack(s) was/were observed; and a sample was evaluated as Δ when it was not possible to distinguish between "○" and "x".

Surface Roughness

Measurement of the surface roughness (the arithmetic average height (Ra) and the maximum height (Rz)) was carried out according to the standard JIS B 0601 using a noncontact-type three-dimensional size measuring device (model NH-3, available from Mitaka Kohki. Co., Ltd.). Cutoff was 0.25 mm, the measured length was 1.50 mm, and measurement was performed five times per a sample.

TABLE 1

| | | First Plating | | Second Plating | | Third Plating | | Heat Treatment | | Post-treatment | | | |
|---|---|---|---|---|---|---|---|---|---|---|---|---|---|
| | | | | | | | | | | Mercapto- | D | | D Compound |
| | | Plating Condition Number | Thickness [μm] | Plating Condition Number | Thickness [μm] | Plating Condition Number | Thickness [μm] | Temperature [° C.] | Time [s] | Phosphate Species | benzothiazole Species | Constituent Compound Species | Applied Amount [μg/mm²] |
| Example A | 1 | 1 | 1 | 1 | 0.22 | 1 | 0.14 | 300 | 3 | P1, P2 | M2 | D11, D21, D31, D51 | 0.29 |
| | 2 | 1 | 1 | 1 | 0.22 | 1 | 0.14 | 300 | 3 | P1 | M2 | D12 | 0.07 |
| | 3 | 1 | 1 | 1 | 0.22 | 1 | 0.14 | 300 | 3 | P1 | M2 | D21 | 0.06 |

TABLE 1-continued

|  |  | First Plating | | Second Plating | | Third Plating | | Heat Treatment | | Post-treatment | | | |
|---|---|---|---|---|---|---|---|---|---|---|---|---|---|
|  |  | Plating Condition Number | Thickness [μm] | Plating Condition Number | Thickness [μm] | Plating Condition Number | Thickness [μm] | Temperature [° C.] | Time [s] | Phosphate Species | Mercapto-benzothiazole Species | D Constituent Compound Species | D Compound Applied Amount [μg/mm²] |
|  | 4 | 1 | 1 | 1 | 0.22 | 1 | 0.14 | 300 | 3 | P1 | M2 | D31 | 0.06 |
|  | 5 | 1 | 1 | 1 | 0.22 | 1 | 0.14 | 300 | 3 | P1 | M2 | D41 | 0.06 |
|  | 6 | 1 | 1 | 1 | 0.22 | 1 | 0.14 | 300 | 3 | P1 | M2 | D51 | 0.07 |
|  | 7 | 1 | 1 | 1 | 0.22 | 1 | 0.14 | 300 | 3 | P1, P2 | M2 | D12, D22, D32, D42, D52 | 0.35 |
|  | 8 | 1 | 1 | 1 | 0.22 | 1 | 0.14 | 300 | 3 | P2 | M1 | D11, D21, D31, D51 | 0.29 |
|  | 9 | 1 | 1 | 1 | 0.22 | 1 | 0.05 | 300 | 3 | P1, P2 | M1 | D11, D21, D31, D51 | 0.29 |
|  | 10 | 1 | 1 | 1 | 0.5 | 1 | 0.2 | 300 | 10 | P1, P2 | M2 | D11, D21, D31, D51 | 0.29 |
|  | 11 | 1 | 0.07 | 1 | 0.22 | 1 | 0.14 | 300 | 3 | P1, P2 | M2 | D11, D21, D31, D51 | 0.29 |
|  | 12 | 1 | 3 | 1 | 0.22 | 1 | 0.14 | 300 | 3 | P1, P2 | M2 | D11, D21, D31, D51 | 0.29 |
|  | 13 | 1 | 1 | 1 | 0.35 | 1 | 0.14 | 300 | 3 | P1, P2 | M2 | D11, D21, D31, D51 | 0.29 |
|  | 14 | 1 | 1 | 1 | 0.1 | 1 | 0.2 | 300 | 3 | P1, P2 | M2 | D11, D21, D31, D51 | 0.29 |
|  | 15 | 1 | 1 | 1 | 0.2 | 1 | 0.17 | 300 | 3 | P1, P2 | M2 | D11, D21, D31, D51 | 0.29 |
|  | 16 | 1 | 1 | 1 | 0.22 | 1 | 0.14 | 260 | 3 | P1, P2 | M2 | D11, D21, D31, D51 | 0.29 |
|  | 17 | 1 | 1 | 1 | 0.22 | 1 | 0.14 | 280 | 3 | P1, P2 | M2 | D11, D21, D31, D51 | 0.29 |
|  | 18 | 1 | 1 | 1 | 0.07 | 1 | 0.2 | 400 | 5 | P1, P2 | M2 | D11, D21, D31, D51 | 0.29 |
|  | 19 | 2 | 1 | 1 | 0.22 | 1 | 0.14 | 300 | 3 | P1, P2 | M2 | D11, D21, D31, D51 | 0.29 |
|  | 20 | 4 | 1 | 1 | 0.22 | 1 | 0.14 | 300 | 3 | P1, P2 | M2 | D11, D21, D31, D51 | 0.29 |
|  | 21 | 1 | 1 | 1 | 0.22 | 1 | 0.14 | 300 | 3 | P1, P2 | M2 | D11, D21, D31, D51 | 0.29 |
|  | 22 | 1 | 1 | 1 | 0.22 | 1 | 0.14 | 300 | 3 | P1, P2 | M2 | D11, D21, D31, D51 | 0.29 |
|  | 23 | 3 | 1 | 1 | 0.22 | 1 | 0.14 | 300 | 3 | P1, P2 | M2 | D11, D21, D31, D51 | 0.29 |
|  | 24 | 1 | 1 | 1 | 0.22 | 1 | 0.14 | 255 | 3 | P1, P2 | M2 | D11, D21, D31, D51 | 0.29 |
|  | 25 | 1 | 1 | 1 | 0.22 | 1 | 0.14 | 285 | 3 | P1, P2 | M2 | D11, D21, D31, D51 | 0.29 |
|  | 26 | 1 | 1 | 1 | 0.25 | 1 | 0.11 | 600 | 0.5 | P1, P2 | M2 | D11, D21, D31, D51 | 0.29 |
|  | 27 | 1 | 1 | 1 | 0.23 | 1 | 0.11 | 285 | 3 | P1, P2 | M2 | D11, D21, D31, D51 | 0.29 |
|  | 28 | 4 | 1 | 2 | 0.30 |  |  | 300 | 3 | P1, P2 | M2 | D11, D21, D31, D51 | 0.29 |
|  | 29 | 1 | 1 |  |  | 2 | 0.3 |  |  | P1, P2 | M2 | D11, D21, D31, D51 | 0.29 |
| Example B | 1 | 1 | 1 | 1 | 0.22 | 1 | 0.14 | 300 | 3 | P1, P2 | M2 | D11, D21, D31, D51 | 0.003 |
|  | 2 | 1 | 1 | 1 | 0.22 | 1 | 0.14 | 300 | 3 | P1, P2 | M2 | D11, D21, D31, D51 | 12 |
|  | 3 | 1 | 1 | 1 | 0.1 | 1 | 0.3 | 280 | 3 | P1, P2 | M2 | D11, D21, D31, D51 | 0.29 |
|  | 4 | 1 | 1 | 1 | 0.22 | 1 | 0.14 | 250 | 3 | P1, P2 | M2 | D11, D21, D31, D51 | 0.29 |
|  | 5 | 1 | 1 | 1 | 0.05 | 1 | 0.2 | 280 | 3 | P1, P2 | M2 | D11, D21, D31, D51 | 0.29 |
|  | 6 | 5 | 1 | 1 | 0.22 | 1 | 0.14 | 300 | 3 | P1, P2 | M2 | D11, D21, D31, D51 | 0.29 |
|  | 7 | 1 | 1 | 1 | 0.01 | 1 | 0.05 | 300 | 3 | P1, P2 | M2 | D11, D21, D31, D51 | 0.29 |
|  | 8 | 1 | 1 | 1 | 1 | 1 | 0.3 | 500 | 5 | P1, P2 | M2 | D11, D21, D31, D51 | 0.29 |
|  | 9 | 1 | 1 | 1 | 0.22 | 1 | 0.07 | 300 | 3 | P1, P2 | M2 | D11, D21, D31, D51 | 0.29 |
|  | 10 | 1 | 1 | 1 | 0.22 | 1 | 0.6 | 300 | 3 | P1, P2 | M2 | D11, D21, D31, D51 | 0.29 |
|  | 11 | 1 | 0.03 | 1 | 0.22 | 1 | 0.14 | 300 | 3 | P1, P2 | M2 | D11, D21, D31, D51 | 0.29 |

TABLE 1-continued

|  |  | First Plating | | Second Plating | | Third Plating | | Heat Treatment | | Post-treatment | | | |
|---|---|---|---|---|---|---|---|---|---|---|---|---|---|
|  |  | Plating Condition Number | Thickness [μm] | Plating Condition Number | Thickness [μm] | Plating Condition Number | Thickness [μm] | Temperature [°C.] | Time [s] | Phosphate Species | Mercaptobenzothiazole Species | D Constituent Compound Species | D Compound Applied Amount [μg/mm²] |
|  | 12 | 1 | 5.5 | 1 | 0.22 | 1 | 0.14 | 300 | 3 | P1, P2 | M2 | D11, D21, D31, D51 | 0.29 |
|  | 13 | 1 | 0.5 | 1 | 1 | 1 | 0.05 | 600 | 30 | P1, P2 | M2 | D11, D21, D31, D51 | 0.29 |
| Comp. | 1 | 1 | 1 | 1 | 0.22 | 1 | 0.14 | 300 | 3 |  | M2 | D11, D21, D31, D51 | 0.29 |
|  | 2 | 1 | 1 | 1 | 0.22 | 1 | 0.14 | 300 | 3 | P1, P2 |  | D11, D21, D31, D51 | 0.29 |
|  | 3 | 1 | 1 | 1 | 0.22 | 1 | 0.14 | 300 | 3 | P1, P2 | M2 |  | 0 |
|  | 4 | 1 | 1 | 1 | 1 |  |  | 300 | 3 | P1, P2 | M2 | D11, D21, D31, D51 | 0.29 |
|  | 5 | 4 | 1 | 2 | 1 |  |  | 300 | 3 |  |  |  | 0 |

P1: lauryl acidic phosphate monoester
P1: lauryl acidic phosphate diester
M1: mercaptobenzothiazole
M2: Na salt of mercaptobenzothiazole
D11: barium dinonylnaphthalenesulfonate
D12: calcium dinonylnaphthalenesulfonate
D21: benzotriazole
D22: Na salt of benzotriazole
D31: paraffin wax
D32: white petrolatum
D41: oleic amide
D42: stearic amide
D51: propylene glycol t-butyl ether
D52: propylene glycol monomethyl ether

TABLE 2

|  |  | Layer 14 (Upper Layer) | | | Layer 13 (Intermediate Layer) | | | Thickness Ratio of Upper Layer and Intermediate Layer | Composition and Thickness of Layer between Intermediate Layer and Lower Layer |
|---|---|---|---|---|---|---|---|---|---|
|  |  | Competition | Structure | Thickness [μm] | Compuition | Structure | Thickness [μm] | | |
| Example A | 1 | Ag:Sn = 8:2 | ζ Phase and ε Phase | 0.30 | Sn:Ni = 7:3 | Ni₃Sn₄ and β Sn | 0.07 | 8:2 | — |
|  | 2 | Ag:Sn = 8:2 | ζ Phase and ε Phase | 0.30 | Sn:Ni = 7:3 | Ni₃Sn₄ and β Sn | 0.07 | 8:2 | — |
|  | 3 | Ag:Sn = 8:2 | ζ Phase and ε Phase | 0.30 | Sn:Ni = 7:3 | Ni₃Sn₄ and β Sn | 0.07 | 8:2 | — |
|  | 4 | Ag:Sn = 8:2 | ζ Phase and ε Phase | 0.30 | Sn:Ni = 7:3 | Ni₃Sn₄ and β Sn | 0.07 | 8:2 | — |
|  | 5 | Ag:Sn = 8:2 | ζ Phase and ε Phase | 0.30 | Sn:Ni = 7:3 | Ni₃Sn₄ and β Sn | 0.07 | 8:2 | — |
|  | 6 | Ag:Sn = 8:2 | ζ Phase and ε Phase | 0.30 | Sn:Ni = 7:3 | Ni₃Sn₄ and β Sn | 0.07 | 8:2 | — |
|  | 7 | Ag:Sn = 8:2 | ζ Phase and ε Phase | 0.30 | Sn:Ni = 7:3 | Ni₃Sn₄ and β Sn | 0.07 | 8:2 | — |
|  | 8 | Ag:Sn = 8:2 | ζ Phase and ε Phase | 0.30 | Sn:Ni = 7:3 | Ni₃Sn₄ and β Sn | 0.07 | 8:2 | — |
|  | 9 | Ag:Sn = 8:2 | ζ Phase and ε Phase | 0.03 | Sn:Ni = 7:3 | Ni₃Sn₄ and β Sn | 0.07 | 13:87 | — |
|  | 10 | Ag:Sn = 8:2 | ζ Phase and ε Phase | 0.60 | Sn:Ni = 7:3 | Ni₃Sn₄ and β Sn | 0.07 | 9:1 | — |
|  | 11 | Ag:Sn = 8:2 | ζ Phase and ε Phase | 0.30 | Sn:Ni = 7:3 | Ni₃Sn₄ and β Sn | 0.07 | 8:2 | — |
|  | 12 | Ag:Sn = 8:2 | ζ Phase and ε Phase | 0.30 | Sn:Ni = 7:3 | Ni₃Sn₄ and β Sn | 0.07 | 8:2 | — |
|  | 13 | Ag:Sn = 85:15 | ζ Phase | 0.30 | Sn:Ni = 7:3 | Ni₃Sn₄ and β Sn | 0.07 | 8:2 | — |
|  | 14 | Ag:Sn = 4:6 | ε Phase and β Sn Layer | 0.30 | Sn:Ni = 7:3 | Ni₃Sn₄ and β Sn | 0.07 | 8:2 | — |
|  | 15 | Ag:Sn = 3:1 | ε phase | 0.30 | Sn:Ni = 7:3 | Ni₃Sn₄ and β Sn | 0.07 | 9:1 | — |
|  | 16 | Ag:Sn = 8:2 | ζ Phase and ε Phase | 0.30 | Sn:Ni = 4:6 | Ni₃Sn2 | 0.07 | 8:2 | — |
|  | 17 | Ag:Sn = 8:2 | ζ Phase and ε Phase | 0.30 | Sn:Ni = 5:5 | Ni₃Sn₂ and Ni₃Sn₄ | 0.07 | 8:2 | — |

TABLE 2-continued

|  |  | Layer 14 (Upper Layer) | | | Layer 13 (Intermediate Layer) | | | Thickness Ratio of Upper Layer and Intermediate Layer | Composition and Thickness of Layer between Intermediate Layer and Lower Layer |
|---|---|---|---|---|---|---|---|---|---|
|  |  | Competition | Structure | Thickness [μm] | Compuition | Structure | Thickness [μm] | | |
|  | 18 | Ag:Sn = 8:2 | ζ Phase and ε Phase | 0.10 | Sn:Ni = 7:3 | Ni$_3$Sn$_4$ and β Sn | 0.20 | 8:2 | — |
|  | 19 | Ag:Sn = 8:2 | ζ Phase and ε Phase | 0.30 | Sn:Ni = 7:3 | Ni$_3$Sn$_4$ and β Sn | 0.07 | 8:2 | — |
|  | 20 | Ag:Sn = 8:2 | ζ Phase and ε Phase | 0.30 | Sn:Ni = 7:3 | Ni$_3$Sn$_4$ and β Sn | 0.07 | 8:2 | — |
|  | 21 | Ag:Sn = 8:2 | ζ Phase and ε Phase | 0.30 | Sn:Ni = 7:3 | Ni$_3$Sn$_4$ and β Sn | 0.07 | 8:2 | — |
|  | 22 | Ag:Sn = 8:2 | ζ Phase and ε Phase | 0.30 | Sn:Ni = 7:3 | Ni$_3$Sn$_4$ and β Sn | 0.07 | 8:2 | — |
|  | 23 | Aa:Sn = 8:2 | ζ Phase and ε Phase | 0.30 | Sn:Cu = 7:3 | — | 0.07 | 8:2 | — |
|  | 24 | Ag:Sn = 8:2 | ζ Phase and ε Phase | 0.30 | Sn:Ni = 37:63 | Ni$_3$Sn$_2$ and Ni$_3$Sn$_4$ | 0.07 | 8:2 | — |
|  | 25 | Ag:Sn = 8:2 | ζ Phase and ε Phase | 0.30 | Sn:Ni = 55:45 | Ni$_3$Sn$_4$ | 0.07 | 8:2 | — |
|  | 26 | Ag:Sn = 8:2 | ζ Phase and ε Phase | 0.30 | Sn:Ni = 7:3 | Ni$_3$Sn$_4$ ŁβSn | 0.07 | 8:2 | Ag:Sn = 1:4 0.03 μm |
|  | 27 | Ag:Sn = 3:1 | ε Phase | 0.30 | Sn:Ni = 55:45 | Ni$_3$Sn$_4$ | 0.07 | 9:1 | — |
|  | 28 | Sn | β Sn | 0.30 | Sn:Ni = 7:3 | Ni$_3$Sn$_4$ and β Sn | 0.07 | 8:2 | — |
|  | 29 | In | Pure In | 0.30 | | | | | — |
| Example B | 1 | Ag:Sn = 8:2 | ζ Phase and ε Phase | 0.30 | Sn:Ni = 7:3 | Ni$_3$Sn$_4$ and β Sn | 0.07 | 8:2 | — |
|  | 2 | Ag:Sn = 8:2 | ζ Phase and ε Phase | 0.30 | Sn:Ni = 7:3 | Ni$_3$Sn$_4$ and β Sn | 0.07 | 8:2 | — |
|  | 3 | Ag:Sn = 3:7 | ε Phase and β Sn Layer | 0.50 | Sn:Ni = 7:3 | Ni$_3$Sn$_4$ and β Sn | 0.07 | 8:2 | — |
|  | 4 | Ag:Sn = 8:2 | ζ Phase and ε Phase | 0.30 | Sn:Ni = 37:63 | Ni$_3$Sn and Ni$_3$Sn$_4$ | 0.07 | 8:2 | — |
|  | 5 | Ag:Sn = 8:2 | ζ Phase and ε Phase | 0.30 | Sn:Ni = 7:3 | Ni$_3$Sn$_4$ and β Sn | 0.2 | 8:2 | — |
|  | 6 | Ag:Sn = 8:2 | ζ Phase and ε Phase | 0.30 | Sn:Ni = 7:3 | Ni$_3$Sn$_4$ and β Sn | 0.07 | 8:2 | — |
|  | 7 | Ag:Sn = 8:2 | ζ Phase and ε Phase | 0.01 | Sn:Ni = 7:3 | Ni$_3$Sn$_4$ and β Sn | 0.07 | 13:87 | — |
|  | 8 | Ag:Sn = 8:2 | ζ Phase and ε Phase | 1.30 | Sn:Ni = 7:3 | Ni$_3$Sn$_4$ and β Sn | 0.07 | 5:95 | — |
|  | 9 | Ag:Sn = 8:2 | ζ Phase and ε Phase | 0.90 | Sn:Ni = 7:3 | Ni$_3$Sn$_4$ and β Sn | 0.005 | 99:1 | — |
|  | 10 | Ag:Sn = 8:2 | £ Phase and ε Phase | 0.30 | Sn:Ni = 7:3 | Ni$_3$Sn$_4$ and β Sn | 0.50 | 38:62 | — |
|  | 11 | Ag:Sn = 8:2 | ζ Phase and ε Phase | 0.30 | Sn:Ni = 7:3 | Ni$_3$Sn$_4$ and β Sn | 0.07 | 8:2 | — |
|  | 12 | Ag:Sn = 8:2 | ζ Phase and ε Phase | 0.30 | Sn:Ni = 7:3 | Ni$_3$Sn$_4$ and β Sn | 0.07 | 8:2 | — |
|  | 13 | Aa:Sn = 97:3 | ε Phase and β Sn Layer | 0.90 | | | | — | — |
| Comp. | 1 | Ag:Sn = 8:2 | ζ Phase and ε Phase | 0.30 | Sn:Ni = 7:3 | Ni$_3$Sn$_4$ and β Sn | 0.07 | 8:2 | — |
|  | 2 | Ag:Sn = 8:2 | ζ Phase and ε Phase | 0.30 | Sn:Ni = 7:3 | Ni$_3$Sn$_4$ and β Sn | 0.07 | 8:2 | — |
|  | 3 | Ag:Sn = 8:2 | ζ Phase and ε Phase | 0.30 | Sn:Ni = 7:3 | Ni$_3$Sn$_4$ and β Sn | 0.07 | 8:2 | — |
|  | 4 | Ag | Pure Ag | 1.00 | | | | — | — |
|  | 5 | Sn | β Sn | 1.00 | Sn:Ni = 7:3 | Ni$_3$Sn$_4$ and β Sn | 0.07 | 93:7 | — |

TABLE 3

|  |  | Layer 12 (Lower Layer) | | Layer 14 (Upper Layer) | | | Number of Whiskers with Length less than 20 μm | Number of Whiskers with Length of 20 μm or more |
|---|---|---|---|---|---|---|---|---|
|  |  | Composition | Thickness [μm] | Ultrafine Hardness [MPa] | Surface Roughness Ra [μm] | Rz [μm] | | |
| Example A | 1 | Ni (Semibright) | 1 | 4000 | 0.068 | 0.424 | 0 | 0 |
|  | 2 | Ni (Semibright) | 1 | 4000 | 0.068 | 0.424 | 0 | 0 |
|  | 3 | Ni (Semibright) | 1 | 4000 | 0.068 | 0.424 | 0 | 0 |
|  | 4 | Ni (Semibright) | 1 | 4000 | 0.068 | 0.424 | 0 | 0 |

TABLE 3-continued

| | | Layer 12 (Lower Layer) | | Layer 14 (Upper Layer) | | | Number of Whiskers with Length less than 20 μm | Number of Whiskers with Length of 20 μm or more |
|---|---|---|---|---|---|---|---|---|
| | | Composition | Thickness [μm] | Ultrafine Hardness [MPa] | Surface Roughness Ra [μm] | Rz [μm] | | |
| | 5 | Ni (Semibright) | 1 | 4000 | 0.068 | 0.424 | 0 | 0 |
| | 6 | Ni (Semibright) | 1 | 4000 | 0.068 | 0.424 | 0 | 0 |
| | 7 | Ni (Semibright) | 1 | 4000 | 0.068 | 0.424 | 0 | 0 |
| | 8 | Ni (Semibright) | 1 | 4000 | 0.068 | 0.424 | 0 | 0 |
| | 9 | Ni (Semibright) | 1 | — | — | — | 0 | 0 |
| | 10 | Ni (Semibright) | 1 | — | — | — | 0 | 0 |
| | 11 | Ni (Semibright) | 0.07 | — | — | — | 0 | 0 |
| | 12 | Ni (Semibright) | 3 | — | — | — | 0 | 0 |
| | 13 | Ni (Semibright) | 1 | — | — | — | 0 | 0 |
| | 14 | Ni (Semibright) | 1 | — | — | — | 0 | 0 |
| | 15 | Ni (Semibright) | 1 | — | — | — | 0 | 0 |
| | 16 | Ni (Semibright) | 1 | — | — | — | 0 | 0 |
| | 17 | Ni (Semibright) | 1 | — | — | — | 0 | 0 |
| | 18 | Ni (Semibright) | 1 | — | — | — | 0 | 0 |
| | 19 | Ni (Bright) | 1 | 7000 | — | — | 0 | 0 |
| | 20 | Ni (Matt) | 1 | 1200 | — | — | 0 | 0 |
| | 21 | Ni (Semibright) | 1 | — | 0.18 | 1.8 | 0 | 0 |
| | 22 | Ni (Semibright) | 1 | — | 0.13 | 1.2 | 0 | 0 |
| | 23 | Cu | 1 | — | — | — | 0 | 0 |
| | 24 | Ni (Semibright) | 1 | — | — | — | 0 | 0 |
| | 25 | Ni (Semibright) | 1 | — | — | — | 0 | 0 |
| | 26 | Ni (Semibright) | 1 | — | — | — | 0 | 0 |
| | 27 | Ni (Semibright) | 1 | — | — | — | 0 | 0 |
| | 28 | Ni(Matt) | 1 | — | — | — | 0 | 0 |
| | 29 | Ni (Semibright) | 1 | — | — | — | 0 | 0 |
| Example B | 1 | Ni (Semibright) | 1 | — | — | — | 0 | 0 |
| | 2 | Ni (Semibright) | 1 | — | — | — | 0 | 0 |
| | 3 | Ni (Semibright) | 1 | — | — | — | ≤1 | 0 |
| | 4 | Ni (Semibright) | 1 | — | — | — | 0 | 0 |
| | 5 | Ni (Semibright) | 1 | — | — | — | 0 | 0 |
| | 6 | Ni:P = 98:2 | 1 | 11000 | — | — | 0 | 0 |
| | 7 | Ni (Semibright) | 1 | — | — | — | 0 | 0 |
| | 8 | Ni (Semibright) | 1 | — | — | — | 0 | 0 |
| | 9 | Ni (Semibright) | 1 | — | — | — | 0 | 0 |
| | 10 | Ni (Semibright) | 1 | — | — | — | 0 | 0 |
| | 11 | Ni (Semibright) | 0.03 | — | — | — | 0 | 0 |
| | 12 | Ni (Semibright) | 5.5 | — | — | — | 0 | 0 |
| | 13 | Ni(Matt) | 0.5 | — | — | — | 0 | 0 |
| Comp. | 1 | Ni (Semibright) | 1 | — | — | — | 0 | 0 |
| | 2 | Ni (Semibright) | 1 | — | — | — | 0 | 0 |
| | 3 | Ni (Semibright) | 1 | — | — | — | 0 | 0 |
| | 4 | Ni (Semibright) | 1 | — | — | — | 0 | 0 |
| | 5 | Ni (Semibright) | 1 | — | — | — | 5 | 2 |

TABLE 4

| | | Adhesive Wear Insertion Force Maximum Insertion Force/Maximum Insertion force of Comparative Example 5 [%] | Contact Resistance [mΩ] | Heat Resistance Contact Resistance [mΩ] | Fretting Corrosion Resistance Contact Resistance [mΩ] | Solder Wettability Zero-cross Time [μm] | Gas Corrosion Resistance, Hydrogen Sulfide Appearance after Test | Mechanical Durability | Bending Workability |
|---|---|---|---|---|---|---|---|---|---|
| Example A | 1 | 60 | 1~3 | 1~3 | 10~50 | 2~4 | No Discoloration | ○ | ○ |
| | 2 | 64 | 1~3 | 1~3 | 10~50 | 2~4 | No Discoloration | ○ | ○ |
| | 3 | 65 | 1~3 | 1~3 | 10~50 | 2~4 | No Discoloration | ○ | ○ |
| | 4 | 63 | 1~3 | 1~3 | 10~50 | 2~4 | No Discoloration | ○ | ○ |
| | 5 | 62 | 1~3 | 1~3 | 10~50 | 2~4 | No Discoloration | ○ | ○ |
| | 6 | 69 | 1~3 | 1~3 | 20~60 | 2~4 | No Discoloration | ○ | ○ |
| | 7 | 55 | 1~3 | 1~3 | 10~50 | 2~4 | No Discoloration | ○ | ○ |
| | 8 | 61 | 1~3 | 1~3 | 10~50 | 2~4 | No Discoloration | ○ | ○ |
| | 9 | 60 | 1~3 | 6~8 | 30~70 | 3~5 | No Discoloration | ○ | ○ |
| | 10 | 62 | 1~3 | 1~3 | 10~50 | 1~3 | No Discoloration | ○ | ○ |
| | 11 | 59 | 1~3 | 1~3 | 10~50 | 2~4 | No Discoloration | ○ | ○ |
| | 12 | 62 | 1~3 | 1~3 | 10~50 | 2~4 | No Discoloration | ○ | ○ |
| | 13 | 60 | 1~3 | 1~3 | 10~50 | 2~4 | No Discoloration | ○ | ○ |
| | 14 | 61 | 1~3 | 1~3 | 10~50 | 2~4 | No Discoloration | ○ | ○ |
| | 15 | 60 | 1~3 | 1~3 | 10~50 | 2~4 | No Discoloration | ○ | ○ |

TABLE 4-continued

| | | Adhesive Wear Insertion Force Maximum Insertion Force/Maximum Insertion force of Comparative Example 5 [%] | Contact Resistance [mΩ] | Heat Resistance Contact Resistance [mΩ] | Fretting Corrosion Resistance Contact Resistance [mΩ] | Solder Wettability Zero-cross Time [µm] | Gas Corrosion Resistance, Hydrogen Sulfide Appearance after Test | Mechanical Durability | Bending Workability |
|---|---|---|---|---|---|---|---|---|---|
| | 16 | 60 | 1~3 | 1~3 | 10~50 | 2~4 | No Discoloration | ○ | ○ |
| | 17 | 60 | 1~3 | 1~3 | 10~50 | 2~4 | No Discoloration | ○ | ○ |
| | 18 | 63 | 1~3 | 4~6 | 30~70 | 2~4 | No Discoloration | ○ | ○ |
| | 19 | 59 | 1~3 | 2~4 | 10~50 | 2~4 | No Discoloration | ○ | Δ |
| | 20 | 61 | 1~3 | 1~3 | 10~50 | 2~4 | No Discoloration | ○ | ○ |
| | 21 | 58 | 1~3 | 1~3 | 10~50 | 2~4 | No Discoloration | ○ | ○ |
| | 22 | 57 | 1~3 | 1~3 | 10~50 | 2~4 | No Discoloration | ○ | ○ |
| | 23 | 62 | 1~3 | 4~6 | 10~50 | 2~4 | No Discoloration | ○ | ○ |
| | 24 | 60 | 1~3 | 1~3 | 10~50 | 2~4 | No Discoloration | ○ | ○ |
| | 25 | 60 | 1~3 | 1~3 | 10~50 | 2~4 | No Discoloration | ○ | ○ |
| | 26 | 61 | 1~3 | 3~5 | 20~60 | 2~4 | No Discoloration | ○ | ○ |
| | 27 | 60 | 1~3 | 1~3 | 10~50 | 2~4 | No Discoloration | ○ | ○ |
| | 28 | 69 | 3~5 | 6~8 | 40~90 | 3~5 | No Discoloration | ○ | Δ |
| | 29 | 63 | 2~4 | 6~8 | 40~90 | 3~5 | No Discoloration | ○ | ○ |
| Example B | 1 | 69 | 1~3 | 1~3 | 30~70 | 2~4 | No Discoloration | ○ | ○ |
| | 2 | 53 | 3~5 | 4~6 | 10~50 | 2~4 | No Discoloration | ○ | ○ |
| | 3 | 64 | 2~4 | 5~7 | 40~90 | 2~4 | No Discoloration | Δ | ○ |
| | 4 | 61 | 1~3 | 1~3 | 10~50 | 2~4 | No Discoloration | ○ | Δ |
| | 5 | 67 | 3~5 | 6~8 | 50~90 | 2~4 | No Discoloration | ○ | ○ |
| | 6 | 58 | 1~3 | 1~3 | 10~50 | 2~4 | No Discoloration | ○ | x |
| | 7 | 59 | 3~5 | 8~10 | 50~90 | 3~5 | No Discoloration | ○ | ○ |
| | 8 | 62 | 1~3 | 1~3 | 10~50 | 1~3 | No Discoloration | ○ | Δ |
| | 9 | 61 | 1~3 | 4~6 | 10~50 | 1~3 | No Discoloration | ○ | ○ |
| | 10 | 60 | 1~3 | 1~3 | 20~60 | 2~4 | No Discoloration | ○ | Δ |
| | 11 | 61 | 1~3 | 6~8 | 10~50 | 2~4 | No Discoloration | ○ | ○ |
| | 12 | 60 | 1~3 | 1~3 | 40~90 | 2~4 | No Discoloration | ○ | ○ |
| | 13 | 60 | 1~3 | 3~5 | 10~50 | 1~3 | No Discoloration | ○ | ○ |
| Comp. | 1 | 68 | 1~3 | 10~12 | 100以上 | 2~4 | Slight Discoloration | Δ | ○ |
| | 2 | 62 | 2~5 | 14~16 | 40~90 | 3~5 | Discoloration | ○ | ○ |
| | 3 | 71 | 1~3 | 1~3 | 10~50 | 2~4 | No Discoloration | ○ | ○ |
| | 4 | 66 | 1~3 | 1~3 | 10~50 | 2~4 | Discoloration | ○ | ○ |
| | 5 | 100 | 1~3 | 16~20 | 100以上 | 2~4 | No Discoloration | ○ | ○ |
| Target | | less than 70 | 10 or less | 10 or less | 100 or less | 5 or less | No Discoloration | ○ | ○ |

Examples A1 to 29 were surface treated plated materials each having lower whisker property, higher solderability, lower contact resistance and lower adhesive wear resistance.

In Example B1, the applied amount of the D constituent compounds was 0.003 µg/mm². The applied amount was lower than that in Example A1, so that the adhesive wear and insertion force were slightly deteriorated, although the target characteristics were obtained.

In Example B2, the applied amount of the D constituent compounds was 12 µg/mm². The applied amount was higher than that in Example A1, so that the contact resistance was somewhat higher, although the target characteristics were obtained.

In Example B3, the upper layer was the ε phase and the βSn layer, and the ratio of Sn in the upper layer was higher than that in Example A1. Therefore, although the target characteristics were obtained and whiskers each having a length of 20 µm or more were not generated, whiskers each having a length of less than 20 µm might be generated.

In Example B4, the composition of the intermediate layer was Sn:Ni=37:63, the ratio of Ni was higher than that in Example A1 and the target characteristics were obtained, but the bending workability was somewhat poor.

In Example B5, the thickness of the intermediate layer was 0.2 µm, and the thickness of the intermediate layer was thicker than that in Example A1, so that the fretting corrosion resistance was somewhat poor, although the target characteristics were obtained.

In Example B6, the lower layer was Ni—P plating, and the ultrafine hardness of the upper layer was harder than that in Example A1 and the target characteristics were obtained, but the bending workability was poor.

In Example B7, the thickness of the upper layer was 0.01 µm, the thickness of the upper layer was thinner that in Example A1 and the target characteristics were obtained, but the heat resistance and the fretting corrosion resistance were somewhat poor.

In Example B8, the thickness of the upper layer was 1.30 µm, the thickness of the upper layer was thicker than that in Example A1 and the target characteristics were obtained, but the bending workability was somewhat poor.

In Example B9, the thickness of the intermediate layer was 0.005 µm, the thickness of the intermediate layer was thinner than that in Example A1 and the target characteristics were obtained, but the heat resistance was somewhat poor.

In Example B10, the thickness of the intermediate layer was 0.50 µm, the thickness of the intermediate layer was thicker than that in Example A1 and the target characteristics were obtained, but the bending workability was somewhat poor.

In Example B11, the thickness of the lower layer was 0.03 µm, the thickness of the lower layer was thinner than that in Example A1 and the target characteristics were obtained, but the heat resistance was somewhat poor.

In Example B12, the thickness of the lower layer was 5.5 µm, the thickness of the lower layer was thicker than that in Example A1 and the target characteristics were obtained, but the fretting corrosion resistance was somewhat poor.

In Example B13, any intermediate layer was not present (0 μm), and the target characteristics were obtained, but the heat resistance was somewhat poor, as compared with Example A1.

In Comparative Example 1, the post-treatment was carried out using a solution containing no phosphate ester, and the heat resistance, the fretting corrosion resistance, the gas corrosion resistance and the mechanical durability were poor.

In Comparative Example 2, the post-treatment was carried out using a solution containing no mercaptobenzothiazole based compound, and the heat resistance and the gas corrosion resistance were poor.

In Comparative Example 3, the post-treatment was carried out using a solution containing no D constituent compound, and the adhesive wear and the insertion force were poor.

In Comparative Example 4, the upper layer was present as Ag alone, so that discoloration occurred in the gas (hydrogen sulfide) corrosion resistance test.

In Comparative Example 5, the upper layer was Sn and no post-treatment was carried out, so that the adhesive wear was larger, and the heat resistance and fretting corrosion resistance were poor.

DESCRIPTION OF REFERENCE NUMERALS 10 surface-treated plated material
11 substrate
12 layer (lower layer)
13 layer (intermediate layer)
14 layer (upper layer)

What is claimed is:

1. A surface-treated plated material, comprising a substrate provided with an upper layer, the upper layer comprising a plated material containing Sn or In,
   wherein the plated material comprises:
   a lower layer comprising one or more selected from a group A of constituent elements consisting of Ni, Cr, Mn, Fe, Co, and Cu, the lower layer being formed on the substrate;
   an intermediate layer comprising one or more selected from said group A of constituent elements and one or two selected from a group B of constituent elements consisting of Sn and In, the intermediate layer being formed on the lower layer; and
   an upper layer comprising an alloy of one or two selected from said B group of constituent elements and one or more selected from a group C of constituent elements consisting of Ag, Au, Pt, Pd, Ru, Rh, Os, and Ir, the upper layer being formed on the intermediate layer, and
   wherein a surface of the plated material contains at least one compound represented by the following general formula [1] or [2] and at least one compound represented by the following general formula [3], and wherein one or more compounds selected from a group D of constituent compounds represented by the following general formulae [4] to [8] are further applied onto a surface on the upper layer side:

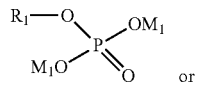
[1]

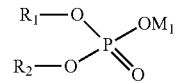
[2]

in which formula [1] or [2], $R_1$ and $R_2$ each independently represents an alkyl or a substituted alkyl, and $M_1$ represents hydrogen or an alkali metal;

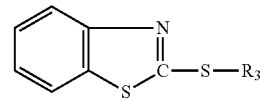
[3]

in which formula [3], $R_3$ represents an alkali metal or hydrogen;

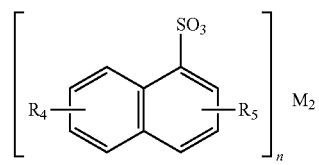
[4]

in which formula [4], $R_4$ and $R_5$ each independently represents an alkyl or a substituted alkyl, $M_2$ represents an alkali metal or an alkaline earth metal, and n represents an integer;

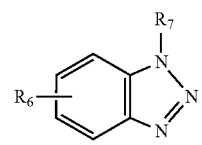
[5]

in which formula [5], $R_6$ represents hydrogen, an alkyl, or a substituted alkyl, and $R_7$ represents an alkali metal, hydrogen, an alkyl, or a substituted alkyl;

$C_nH_m$

[6]

in which formula [6], n and m each represents an integer;

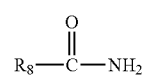
[7]

in which formula [7], $R_8$ represents an alkyl or a substituted alkyl;

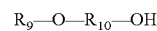
[8]

in which formula [8], $R_9$ and $R_{10}$ each independently represents an alkyl or a substituted alkyl.

2. The surface-treated plated material according to claim 1, wherein the total applied amount of the D constituent compound(s) present on the surface of the plated material is from 0.005 μg/mm² to 10.0 μg/mm².

3. The surface-treated plated material according to claim 1,
wherein a thickness of the lower layer is 0.05 μm or more and less than 5.00 μm,
wherein a thickness of the intermediate layer is 0.01 μm or more and less than 0.40 μm, and
wherein a thickness of the upper layer is 0.02 μm or more and less than 1.00 μm.

4. The surface-treated plated material according to claim 1, wherein the upper layer contains from 10 at. % to 50 at. % of the one or two metals of the group B of constituent elements.

5. The surface-treated plated material according to claim 1, wherein the upper layer comprises a ζ (zeta) phase of a SnAg alloy containing from 11.8 at. % to 22.9 at. % of Sn.

6. The surface-treated plated material according to claim 1, wherein the upper layer comprises an ε (epsilon) phase of $Ag_3Sn$.

7. The surface-treated plated material according to claim 1, wherein the upper layer comprises a ζ (zeta) phase of a SnAg alloy containing from 11.8 at. % to 22.9 at. % of Sn and an ε (epsilon) phase of $Ag_3Sn$.

8. The surface-treated plated material according to claim 1, wherein the upper layer only comprises an ε (epsilon) phase of $Ag_3Sn$.

9. The surface-treated plated material according to claim 1, wherein the upper layer comprises an ε (epsilon) phase of $Ag_3Sn$ and βSn of a Sn single phase.

10. The surface-treated plated material according to claim 1, wherein the upper layer comprising a ζ (zeta) phase of a SnAg alloy containing from 11.8 at. % to 22.9 at. % of Sn, an ε (epsilon) phase of $Ag_3Sn$, and βSn of a single Sn phase.

11. The surface-treated plated material according to claim 1, wherein the intermediate layer contains 35 at. % or more of the one or two metals of the group B of constituent elements.

12. The surface-treated plated material according to claim 1, wherein the intermediate layer comprises $Ni_3Sn_4$.

13. The surface-treated plated material according to claim 1, wherein the intermediate layer comprises $Ni_3Sn_4$ and βSn of a single Sn phase.

14. The surface-treated plated material according to claim 1, wherein it comprises a ratio of thicknesses of the upper layer to the intermediate layer of from 9:1 to 3:7 in the upper layer:the intermediate layer.

15. The surface-treated plated material according to claim 1, wherein it comprises an indentation hardness on a surface of the upper layer of 1000 MPa or more and 10000 MPa or less, the indentation hardness being obtained by measuring a dent struck with a load of 3 mN on the surface of the upper layer by an ultra-micro hardness tester.

16. The surface-treated plated material according to claim 1, wherein it comprises an arithmetic mean height (Ra) of a surface of the upper layer of 0.3 μm or less.

17. The surface-treated plated material according to claim 1, wherein it comprises a maximum height (Rz) of a surface of the upper layer of 3 μm or less.

18. The surface-treated plated material according to claim 1, wherein it comprises the one or more metals of the group A of constituent elements in a total 50% by mass or more of Ni, Cr, Mn, Fe, Co, and Cu, and further comprises one or more selected from the group consisting of B, P, Sn, and Zn.

19. The surface-treated plated material according to claim 1, wherein it comprises the one or two metals of the group B of constituent elements in a total 50% by mass or more of Sn and In, the remaining alloy component being one or more metals selected from the group consisting of Ag, Au, Bi, Cd, Co, Cr, Cu, Fe, Mn, Mo, Ni, Pb, Sb, W, and Zn.

20. The surface-treated plated material according to claim 1, wherein it comprises the one or more metals of the group C of constituent elements in the total 50% by mass or more of Ag, Au, Pt, Pd, Ru, Rh, Os, and Ir, the remaining alloy component being one or more metals selected from the group consisting of Bi, Cd, Co, Cu, Fe, In, Mn, Mo, Ni, Pb, Sb, Se, Sn, W, TI, and Zn.

21. The surface-treated plated material according to claim 1, wherein the intermediate layer is comprised of $Ni_3Sn$ and $Ni_3Sn_2$.

22. The surface-treated plated material according to claim 1, wherein the intermediate layer is comprised of $Ni_3Sn_2$.

23. The surface-treated plated material according to claim 1, wherein the intermediate layer is comprised of $Ni_3Sn_4$.

24. The surface-treated plated material according to claim 1, further comprising a layer comprising an alloy of the one or more metals of the group A of constituent elements and the one or more metals of the group C of constituent elements, between the lower layer and the intermediate layer.

25. A connector terminal comprising the surface-treated plated material according to claim 1 at a contact portion.

26. A connector comprising the connector terminal according to claim 25.

27. An FFC terminal comprising the surface-treated plated material according to claim 1 at a contact portion.

28. An FFC comprising the FFC terminal according to claim 27.

29. An FPC comprising the FFC terminal according to claim 27.

30. An electronic part comprising the surface-treated plated material according to claim 1 on at least one external connecting electrode.

31. An electronic part comprising a press-fit type terminal, the press-fit type terminal comprising a female terminal connecting portion on one side of a mounting portion to be attached to a housing and a substrate connecting portion on the other side, the press-fit type terminal being attached to the substrate by press-fitting the substrate connecting portion into a through hole formed in the substrate,
wherein the press-fit type terminal comprises the surface-treated plated material according to claim 1.

* * * * *